Aug. 27, 1929.  F. C. CANODE  1,725,976
RECORDING DEVICE
Filed Feb. 13, 1928
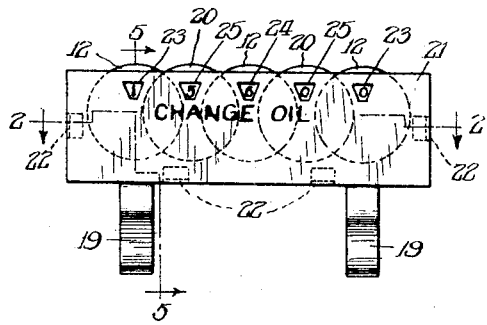
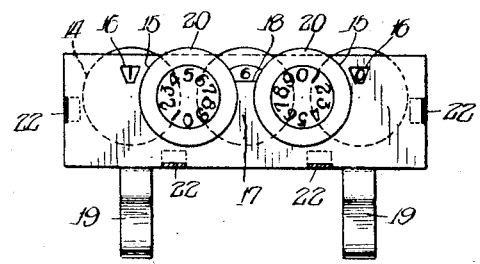
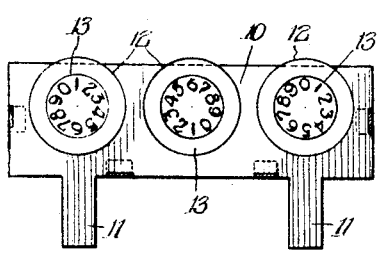
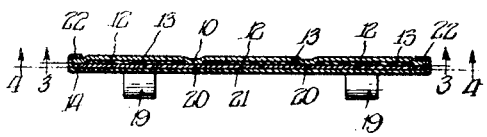
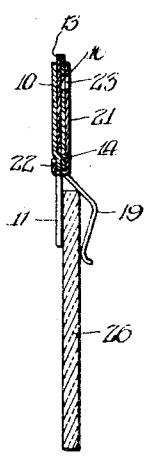
Inventor:
Frederick C. Canode,
By Wilkinson, Huxley, Byron, & Knight
Attys.
Witness:
R. Burkhardt Patented Aug. 27, 1929.

1,725,976

UNITED STATES PATENT OFFICE.

FREDERICK C. CANODE, OF OAK PARK, ILLINOIS.

RECORDING DEVICE.

Application filed February 13, 1928. Serial No. 253,971.

This invention relates to indicating or recording devices and particularly to the type of indicating devices which are manually set and embody a casing and a plurality of rotatable disks with characteristic indicia having their edges extending beyond the edge of the casing in a manner to be readily engaged by the finger for rotating and setting said disks in a desired predetermined manner.

It is one of the objects of this invention to provide an indicating device which has a plurality of indicating disks, a portion of each of which is visible simultaneously.

Another object of my invention is to provide an indicating device in which the disks are in overlapping relation and are mounted in a casing in such manner that their edges form the bearing surfaces with cooperating surfaces in the casing, on which the disks rotate.

It is a further object of my invention to provide an indicating device which is extremely compact and simple in construction, cheaply and easily manufactured and which may be assembled with ease.

It is a further object of my invention to provide a device in which the disks may be locked against accidental rotation so that when the disks have been once set they will not be subject to being accidentally displaced.

It is a further object of my invention to provide a mounting for my device which will serve to adjust the parts in a manner to bind the disks and to lock them against accidental displacement.

A further object of my invention is to provide a device of the above described type which will be serviceable for use as a mileage indicator on automobiles, which indicator will be set at the mileage reading of the speedometer at which it is desirable to have the automobile looked after again, such as, for instance, having the oil in the motor drained and replaced.

Accordingly, it is an object to provide means for mounting the indicator which will be readily received on a suitable support in plain vision of the operator, such as, for instance, the rear view mirror, and to so construct the indicator that when the indicator has been once set and mounted in place the disks are maintained against accidental displacement in a manner to assure at all times an accurate reading of the indicator.

These and other objects are accomplished by means of the arrangement disclosed on the accompanying sheet of drawings, in which—

Figure 1 is an elevational view of an indicator constructed in accordance with my invention.

Figure 2 is a cross-sectional view taken on the line 2—2 of Figure 1, looking in the direction of the arrows.

Figure 3 is a cross-sectional, elevational view taken on the line 3—3 of Figure 2 and looking in the direction of the arrows.

Figure 4 is a cross-sectional, elevational view taken on the line 4—4 of Figure 2 and looking in the direction of the arrows.

Figure 5 is an end elevation in cross-section, taken on the line 5—5 of Figure 1 and looking in the direction of the arrows.

The various novel features of my invention will be apparent from the following description and will be particularly pointed out in the appended claims.

Referring to the drawings, it will be noted that my invention relates to an indicating device comprising a backing plate 10 having depending projections 11, and three circular depressions 12 which are more clearly shown in Figure 2. In the illustrated form the backing plate is preferably of sheet metal and the depressions are formed by stamping, but it is obvious that the backing plate may be formed in any desired manner and of any suitable material.

Located in the circular depressions 12 are three disks 13, having numbers thereon, as shown in Figure 3. Attention is directed to the fact that the disks have no central pivots or bearings, but that their rotation is accomplished by the edges of the disks engaging the circumferential surfaces provided by the depressions 12. The disks 13 may be of any thin material, such as metal, fiber, or pasteboard, provided they are of a thickness substantially equal to the depth of the depressions, so that the face of the backing plate and the disks provide a flush surface.

Mounted on top of the backing plate and disks is the intermediate plate 14, the outline of which is shown in Figure 4, this plate having two circular cuts or openings 15 therein, so positioned relative to the length of the plate that the disks are located in staggered relationship to the disks located in the depressions 12 of the backing plate.

Openings 16 are also provided so located as to expose or permit vision of a portion of the end disks in the backing plate so that the numerals thereon may be seen as they pass by or underlie the openings. The portion of the plate provided between the two openings 15 is in the form of a tongue 17, which terminates at 18 in a manner to expose the upper portion of the middle disk located in the depression 12 of the backing plate.

Depending spring legs or projections 19 are provided on the intermediate plate in a manner to overlie and cooperate with the projections 11 of the backing plate. The function of the depressions is that of supports to serve as a mounting for the indicator substantially in the manner shown in Figure 5. Mounted in the circular cuts 15 are disks 20, adapted for rotation, and here, as in the former case, the bearing surface is provided at the edge of the disks, and the disks are free from a central pivot or bearing. Also, the thickness of the disks is equal to substantially the thickness of the intermediate plate, whereby the surface presented by the intermediate plate and the face of the disks 20 is flush. Positioned on top of the intermediate end disks 20 is the facing plate 21, having tongues 22, which are bent around the edges of the intermediate and backing plates in the manner shown in Figure 2, so as to secure the device in assembled relation.

The facing plate is provided with openings 23, 24 and 25, located in a horizontal row, as shown in Figure 1. The openings 23 register with the opening 16 in the intermediate plate so that a portion of the end disks 12 are visible through both the facing and intermediate plates. The opening 24 is provided to overlie the numerals on the middle disk 12, and above the edge 18 of the tongue 17. The openings 25 are located immediately above portions of the disks 20 in a manner to expose the numerals thereof. Attention is directed to the fact that the depressions in the back plate and the cuts in the intermediate plate are so disposed relative to the plates and the disks are of such size, that their upper edges project slightly above the edge of the casing in a manner to be readily engaged by the thumb or finger in a manner to be rotated to produce any desired number at the row of windows or openings positioned in the face plate.

One of the depending projections is of spring metal and permits the cooperating parts to be engaged over and frictionally grip any support, such as the element 26, shown in Figure 5. One characteristic feature of the present device resides in the fact that the disks, having once been set to indicate a particular number on the face of the indicator, may then be mounted as shown in Figure 5, in which instance the pressure caused by the spreading of the projections 11 and 19 is such that the intermediate plate is caused to slightly twist or bind between both the facing and backing plates in a manner to lock the disks against rotation and to hold them firmly against accidental displacement. This makes for considerable advantage in that the indicator can be set while it is removed from its mounting to any desired indication and can then be positioned on a mounting or supporting piece 26, where it will be maintained by the spring gripping action of the projections against accidental bodily movement, and further, while in such position the individual disks are locked in the position to which they are set.

This invention also contemplates the formation of the disks 12 and 20 initially cupped in shape whereby they will offer a frictional resistance to rotation when they are pressed between the enclosing plates of the casing. This, of course, is true when the disks are formed from resilient material such as sheet metal, and although the convex surface may be on either side, it is preferable to provide the convex surface on the side where the numbers occur.

It is to be further understood that it may be desirable to merely provide disks 12 cup shaped, while leaving the disks 20 of flat construction, or vice versa, but it will undoubtedly be preferable to provide all the disks cup shaped at the same time. The cup formation of the disk is not shown on the drawing for the reason that this is merely an initial formation and they will be pressed substantially flat if held between the plates as shown in Figure 2. The initial formation will merely create a bias toward the bent position when the disks are placed flat between the casing plates.

One particular use which is contemplated for the present invention is that of an oil change indicating device for use with automobiles. It is frequently true that when the oil is changed the reading of the speedometer mileage is noted and it is calculated, by estimating the distance to be run before the next change of oil is to be made, what the reading will be at the time it is desired to next change the oil. Heretofore it has been customary to make a note on a slip of paper as a reminder for the automobile operator. Slips of paper or other written notices of this character are usually lost and are consequently of little value. My indicating device may be used in this capacity with a high degree of success and utility in that it can be mounted on the rear-view mirror or other convenient and conspicuous location in the car in front of the operator, and it will serve well to indicate the new mileage reading of the speedometer at which the oil should be changed. A device of this construction is not subject to being displaced bodily by jar or vibration of the car, and due to the binding action for maintaining the disks against accidental rotation the device is not subject to being changed from the set indication.

It is obvious that there will be various other advantages and uses to which my invention may be put, and that the above mentioned use is merely by way of illustration. The greatest advantages of my device reside in the simplicity of its structure and the readiness with which it is manufactured and assembled, and in the fact that it is highly efficient in service.

It will be further understood that any number of disks may be employed and that instead of numerals the disks may have any characteristic indicia thereon.

I claim:

1. In a device of the character described, a plate having a circular depression formed therein, a disk in said depression and a second plate covering said disk, the edges of said depression serving as a bearing surface for said disc.

2. In a device of the character described a plate having a substantially circular depression formed therein and extending to the edge thereof, a disk in said depression and a second plate covering said disk, in a manner to expose the edge of said disk, the edges of said depression serving as a bearing surface for said disc.

3. In a device of the character described, a casing comprising two plates, each having a projection thereon to form a mounting for said casing, a cavity formed between said plates by a depression formed in one of said plates, and a disk rotatably mounted in said cavity.

4. In a device of the character described, a casing comprising two plates, each having a projection thereon to form a mounting for said casing, a cavity formed between said plates by a depression formed in one of said plates, and a disk rotatably mounted in said cavity, said plates being adapted to bind said disk against rotation when said projections are separated a predetermined amount as when positioned on a suitable support.

5. A device of the character described, a casing comprising a back plate having a circular depression therein, and an intermediate plate overlying said back plate and partially covering said depression, said intermediate plate having a circular cut therein, and a face plate covering said circular cut, and rotatable disks in said depression and circular cut.

6. In a device of the character described, a casing comprising a back plate, an intermediate plate, and face plate, rotatable disks mounted between said back plate and intermediate plate and other rotatable disks mounted between said back plate and face plate, and means for placing a binding strain on said intermediate plate whereby said disks may be maintained against rotation.

7. In a device of the character described, a casing, and a plurality of overlapping rotatable disks mounted therein, the peripheries of said discs being rotatably mounted in bearing surfaces for supporting said discs.

8. A device of the character described, a casing comprising a back plate having circular depressions therein, and an intermediate plate overlying said back plate and partly covering said depressions, said intermediate plate having circular cuts arranged in staggered relation to said depressions, and a face plate covering said circular cuts, and rotatable disks in said depressions and cuts.

9. A device of the character described, a casing comprising a back plate having circular depressions therein, and an intermediate plate overlying said back plate and partly covering said depressions, said intermediate plate having circular cuts arranged in staggered relation to said depressions, and a face plate covering said circular cuts, and rotatable disks in said depressions and cuts, all of said parts being constructed to provide the edges of said disks projecting slightly beyond said casing.

10. A device of the character described, a casing comprising a back plate having circular depressions therein, and an intermediate plate overlying said back plate and partly covering said depressions, said intermediate plate having circular cuts arranged in staggered relation to said depressions, and a face plate covering said circular cuts, rotatable disks in said depressions and cuts, having characteristic indicia thereon, and openings in said face plate and intermediate plate so as to provide simultaneous vision of a portion of all of said disks.

11. A device of the character described, a casing comprising a back plate having circular depressions therein, and an intermediate plate overlying said back plate and partly covering said depressions, said intermediate plate having circular cuts arranged in staggered relation to said depressions, and a face plate covering said circular cuts, and rotatable disks in said depressions and cuts, said disks having numerals thereon, and said casing having openings exposing simultaneously one numeral of each disk in a manner to assimilate a multiple digit numeral.

12. In a device of the character described, a plate having a substantially circular depression formed therein, and extending to the edge thereof, a disk in said depression and a second plate covering said disk in a manner to expose said disk, said disk being initially cupped in shape whereby a frictional resistance to rotation is created.

13. In a device of the character described, a casing comprising a back plate, an intermediate plate, and a face plate, rotatable disks mounted between said back plate and intermediate plate and other rotatable disks mounted between said back plate and face plate, said disks being initially cupped in shape, whereby a frictional resistance to rotation is created.

14. In a device of the character described, a casing comprising a back plate, a face plate and an intermediate plate, said intermediate plate having a substantially circular cut therethrough extending to the edge of said casing and a disk in said cut, whereby a portion of said disk extends beyond the edge of said casing.

15. In a device of the character described, a casing comprising a back plate, a face plate and an intermediate plate, said intermediate plate having a substantially circular cut therethrough and a disk in said cut, said disk being initially cupped in shape, whereby a frictional resistance to rotation is created.

Signed at Chicago, Illinois, this 10th day of February, 1928.

FREDERICK C. CANODE.